(12) United States Patent
Pomerance

(10) Patent No.: US 7,529,679 B1
(45) Date of Patent: May 5, 2009

(54) AUTOMATED ALTERNATIVE DISPUTE RESOLUTION

(76) Inventor: Brenda Pomerance, 260 W. 52 St., Apt. 27B, New York, NY (US) 10019

( * ) Notice: Subject to any disclaimer, the term of this patent is extended or adjusted under 35 U.S.C. 154(b) by 1097 days.

(21) Appl. No.: 09/543,049

(22) Filed: Apr. 5, 2000

(51) Int. Cl.
*G06Q 99/00* (2006.01)
(52) U.S. Cl. .......................................... 705/1
(58) Field of Classification Search ............ 705/1, 705/10, 26, 37, 80, 50–79; 706/19, 45, 46, 706/925
See application file for complete search history.

(56) References Cited

U.S. PATENT DOCUMENTS

| | | | |
|---|---|---|---|
| 5,504,837 A * | 4/1996 | Griffeth et al. ................ 706/46 |
| 5,668,953 A | 9/1997 | Sloo | |
| 5,826,250 A | 10/1998 | Trefler | |
| 5,878,139 A * | 3/1999 | Rosen .......................... 705/26 |
| 5,878,214 A * | 3/1999 | Gilliam et al. ......... 395/200.34 |
| 5,895,450 A | 4/1999 | Sloo | |
| 5,956,687 A | 9/1999 | Wamsley | |
| 6,026,387 A * | 2/2000 | Kesel .......................... 706/46 |
| 6,119,933 A * | 9/2000 | Wong et al. ................ 235/380 |
| 6,145,096 A * | 11/2000 | Bereiter et al. ............... 714/25 |
| 6,154,753 A * | 11/2000 | McFarland ................ 707/508 |
| 6,177,932 B1 | 1/2001 | Galdes et al. | |
| 6,222,535 B1 * | 4/2001 | Hurd, II ....................... 345/331 |
| 6,260,024 B1 * | 7/2001 | Shkedy ........................ 705/37 |
| 6,330,551 B1 * | 12/2001 | Burchetta et al. ............ 705/80 |
| 2001/0037204 A1 * | 11/2001 | Horn et al. ..................... 705/1 |
| 2002/0035480 A1 * | 3/2002 | Gordon et al. .................. 705/1 |
| 2002/0069182 A1 * | 6/2002 | Dwyer ........................ 705/80 |
| 2002/0133362 A1 * | 9/2002 | Karathanasis et al. .......... 705/1 |
| 2002/0161597 A1 * | 10/2002 | Klibaner ........................ 705/1 |
| 2003/0014265 A1 * | 1/2003 | Landry et al. .................. 705/1 |

FOREIGN PATENT DOCUMENTS

| | | | |
|---|---|---|---|
| WO | WO 96/26496 A1 * | 8/1996 |
| WO | WO 99/04356 A1 * | 1/1999 |
| WO | WO 00/08582 A1 * | 2/2000 |
| WO | WO 00/67426 A1 * | 11/2000 |

(Continued)

OTHER PUBLICATIONS

Goch, Lynna, "Splitting the Difference", Best's Review (Life/Health), vol. 99, No. 11, pp. 83-84, Mar. 1999.*

(Continued)

*Primary Examiner*—Andrew J. Fischer
*Assistant Examiner*—Jacob C Coppola
(74) *Attorney, Agent, or Firm*—Brenda Pomerance

(57) ABSTRACT

In automated alternative dispute resolution, a communication from a party is automatically received, the communication being a portion of a pre-defined dispute resolution process, the communication is processed, and returned to the party. A comment relating to an automated alternative dispute resolution process is automatically provided by determining that an action or inaction by a subject has occurred in a pre-defined dispute resolution process, preparing a comment about the subject's action or inaction, and sending the comment to a comment collection system. A record is automatically prepared for an alternative dispute resolution process by collecting communications between an automated alternative dispute resolution system and at least one of the parties to the dispute, automatically summarizing the collection of communications, and presenting the summary and the collection of communications to a dispute resolver.

8 Claims, 4 Drawing Sheets

FOREIGN PATENT DOCUMENTS

WO      WO 00/68865 A1 * 11/2000
WO      WO 01/45006 A1 * 6/2001

OTHER PUBLICATIONS

Anonymous, "Beenz.com Protects Consumers Through Partnership With WebAssured.com", Magazine Article, Dialog File 636:Gale Group Newsletter DB, M2 Presswire, Dec. 22, 1999.*

Dennehy, Michelle, "New Online Mediation Service", New Article, Mar. 9, 2000.*

Anonymous, "NAM—Parent Compant of ClichNSettle.com Receives Top Industry Award for Innovation", Press Release, Mar. 17, 2000.*

Anonymous, "SqareTrade Launches New Consumer Protection Tool; First Online Dispute Resolution Pilot on eBay", Press Release, Dialog File 621:New Product Announcement, Business Wire, Mar. 20, 2000.*

Anonymous, "Online Mediation Offered for Resolving E-Commerce Disputes", Press Release, Mar. 23, 2000.*

Miller III, Stanley, "Making Shoppers a Little More Comfortable", Journal Sentinel, Mar. 27, 2000.*

Yeung, Lorrita N.T., "Confrontation or Resolution Management: Discourse Strategies for Dealing With Conflict in Participative Decision-Making", Journal of Applied Management Studies, vol. 6, No. 1, pp. 63-75, Jun. 1997.*

Eisen, Joel B., "Are We Ready For Mediation in Cyberspace", Brigham Young University Law Review, vol. 1998, No. 4, pp. 1305-1358, 1998.*

Brownwell, Eileen O., "Say It Right", IIE Solutions, vol. 31, No. 2, Feb. 1999.*

Anonymous, "A World First: eResolution Goes After the Cybersquatters With a Fully Online Arbitration System (ADR)", Dialog File 20:Dialog Global Reporter, Mar. 1, 2000.*

Zachner, Annette, "Learn From Your Customers or Future May Be Bleak", Best's Review (Life/Health), vol. 96, No. 5, pp. 70-77 Sep. 1995.*

Goldsmith, Marshall, "Conflict Resolution", Executive Excellence, vol. 16, No. 10, pp. 17-18, Oct. 1999.*

Denaburg, Charles L, "Mediation Advocacy", Commercial Law Bulletin, vol. 14, No. 1, pp. 34, Jan. 1999.*

Zemke, Ron, "The Emerging Art of Service Management", Training, vol. 29, No. 1, pp. 36-42, Jan. 1992.*

Leeds, Dorothy, "12 Words That Can Improve Client Relationships", Accounting Today, vol. 9, No. 7, p. 28, Apr. 24, 1995.*

Eisen, Joel B., "Are We Ready for Mediation in Cyberspace?", Brigham Young University Law Review, vol. 1998, No. 4, pp. 1305-1358, 1998.*

Vignette Press Release, Apr. 11, 2000 (one page).

Brightware Answer/Classify Product, Oct. 1999 (three pages).

Echomail XIVA technology, www.interactive.com/flash/products/technology.html (one page).

Kana Classify, Feb. 2000 (two pages).

Card Systems eCardSMART Exceptions Management System Press Release, Feb. 9, 2000 (two pages).

www.onlinemediators.com, printed Apr. 3, 2000 (eight pages).

www.squaretrade.com, printed Apr. 18, 2000 (two pages).

American Express, Online Merchant Services, Resolve Disputes, printed Apr. 23, 2000 (one page).

www.ugetheard.com, printed May 3, 2000 (eight pages).

Press-release for Virtual Magistrate project, Mar. 4, 1996, http://cypherpunks.venona.com/data/1996/03/msg00592.html, 4 pages.

Icourthouse web pages: Be A Juror, Rules of Procedure, Press Release dated Nov. 8, 1999, total of 5 pages, printed Mar. 16, 2001.

Katsh, Ethan and Rifkin, Janet, *Online Dispute Resolution*, Jossey-Bass, 2001, pp. 54-57, 106-107.

\* cited by examiner

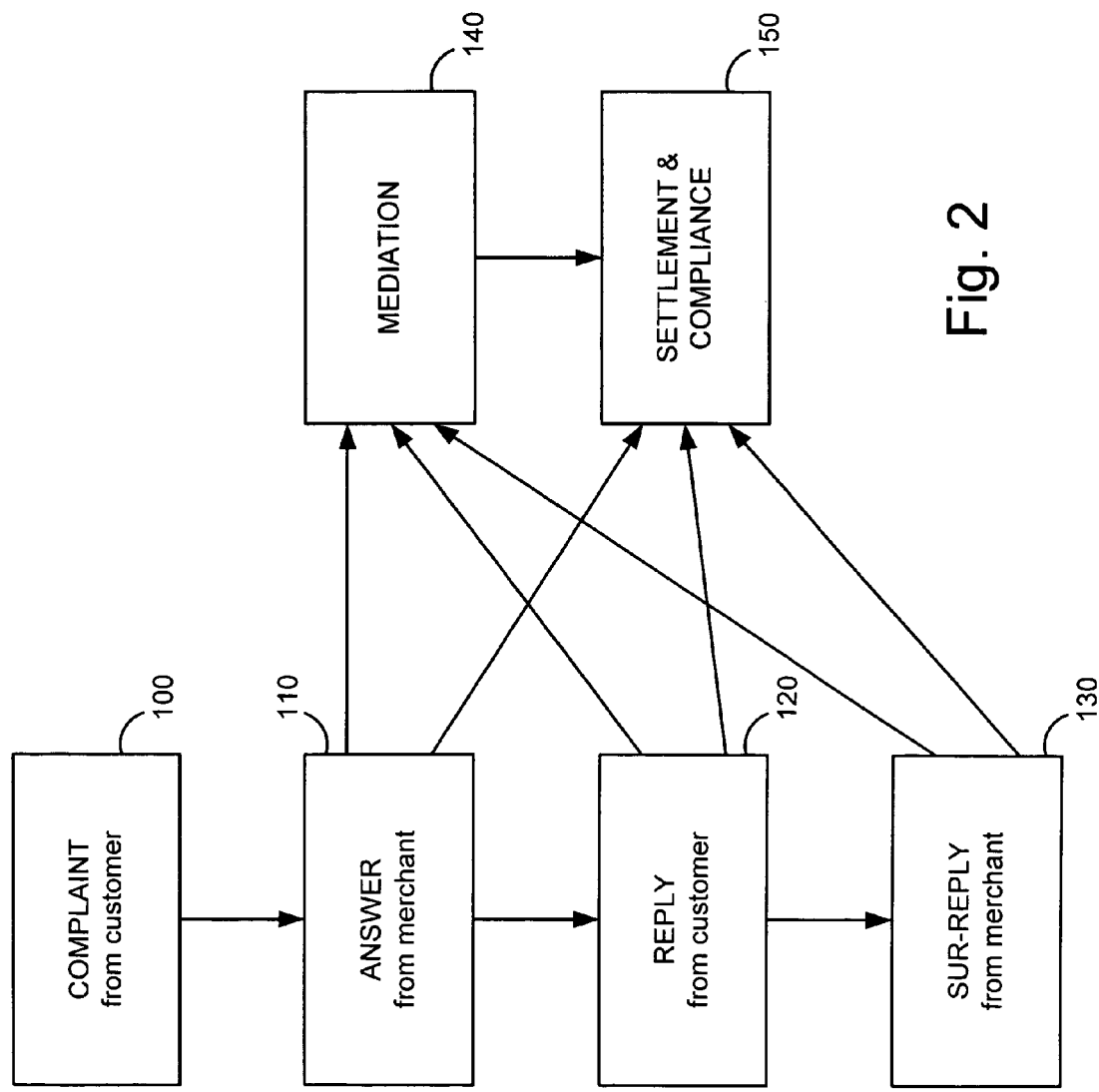

AUTOMATED ALTERNATIVE DISPUTE RESOLUTION

BACKGROUND OF THE INVENTION

The present invention relates to dispute resolution, and more particularly, is directed to using a communication network to assist parties in resolving an electronic commerce dispute and automatically leaving comments to promote participation in and compliance with the automated dispute resolution.

When parties to a transaction are no longer in agreement relating to the transaction, they are having a dispute. Conventional methods for dispute resolution are laborious, often involving not only a tangible result, such as a transfer of funds, but also involving an emotional result, such as face-saving. Additionally, even after the parties resolve their conflict, one or more may fail to perform as agreed, creating an enforcement problem.

Electronic commerce (e-commerce) generally refers to buying and selling of goods and/or services using a communication network such as the Internet. Additional issues presented by a dispute relating to an e-commerce transaction include jurisdictional and venue questions, choice of law, and lack of relationship motivation. Relationship motivation refers to the well known guideline that parties who expect to have to deal with each other after a dispute is resolved tend to be more flexible and reasonable during the dispute resolution process, whereas parties that can avoid each other after the dispute resolution tend to present more polarized positions during the dispute resolution process.

When an e-commerce transaction involves a consumer purchasing from a merchant, there are additional considerations: the monetary value of the transaction is often quite small, and the consumer's expectation with regard to timeliness of response by the merchant is for a very fast response. Accordingly, the cost of the dispute resolution process should be small, and it should proceed promptly. From the merchant's viewpoint, dispute resolution offers an opportunity to distinguish themselves to consumers, as a part of the merchant's customer service policy. From the customer's viewpoint, it may be effectively impossible to ensure compliance with any settlement due to geographic separation and the costs of travel.

Some Internet-based automated dispute resolution systems exist. These systems accept proposed settlement value amounts from the disputants, and, if the proposed amounts are within a predetermined range, split the difference. If the proposed amounts differ by more than the predetermined range, then the disputants fend for themselves.

There is a need for a low-cost dispute resolution system that is trusted by consumers and merchants, to further increase the popularity and profitability of e-commerce.

SUMMARY OF THE INVENTION

In accordance with an aspect of this invention, there is provided a method of automated alternative dispute resolution, comprising automatically receiving a communication from a party, the communication being a portion of a pre-defined dispute resolution process, processing the communication, and returning the processed communication to the party.

In accordance with another aspect of this invention, there is provided a method of automatically providing a comment relating to an automated alternative dispute resolution process, comprising: determining that an action or inaction by a subject has occurred in a pre-defined dispute resolution process, preparing a comment about the subject's action or inaction, and sending the comment to a comment collection system.

In accordance with a further aspect of this invention, there is provided a method of automatically preparing a record for an alternative dispute resolution process, comprising collecting communications between an automated alternative dispute resolution system and at least one of the parties to the dispute, automatically summarizing the collection of communications, and presenting the summary and the collection of communications to a dispute resolver.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 2 is a chart depicting the overall steps in the automated dispute resolution system.

DETAILED DESCRIPTION OF THE PREFERRED EMBODIMENTS

Conventional dispute resolution techniques can be sorted according to where decision making authority resides. In assisted negotiation, the disputants are typically interacting directly with each other, with a third party typically helping to ensure the negotiations remain fluid and do not get stuck. In mediation, the disputants sometimes interact with each other, and sometimes have private discussions with a third party who serves to add perspective and point the disputants towards conflict resolution. In arbitration, the disputants agree that a third party will decide the outcome of their dispute after each of the disputants presents their case to the third party. In formal judicial proceedings, the disputants are represented by professional counsel, and present their case to a judge, who issues a binding decision enforceable by the contempt power of the court. These techniques are also roughly increasing in time of dispute resolution and cost of the dispute resolution process.

The present invention is useful for assisted negotiation, and also for mediation. Because of its record-keeping ability, the present invention is also helpful during arbitration.

When communications between parties are via the Internet, the dispute resolution process naturally becomes asynchronous. This is good, as it allows the parties time to reflect and calm volatile emotions. One of the key functions of a third party in dispute resolution is to filter the emotional reactions of the disputants. An advantage of an automated system is that disputants believe it is not swayed by emotional arguments, and so is perceived as fair.

Figure 1:
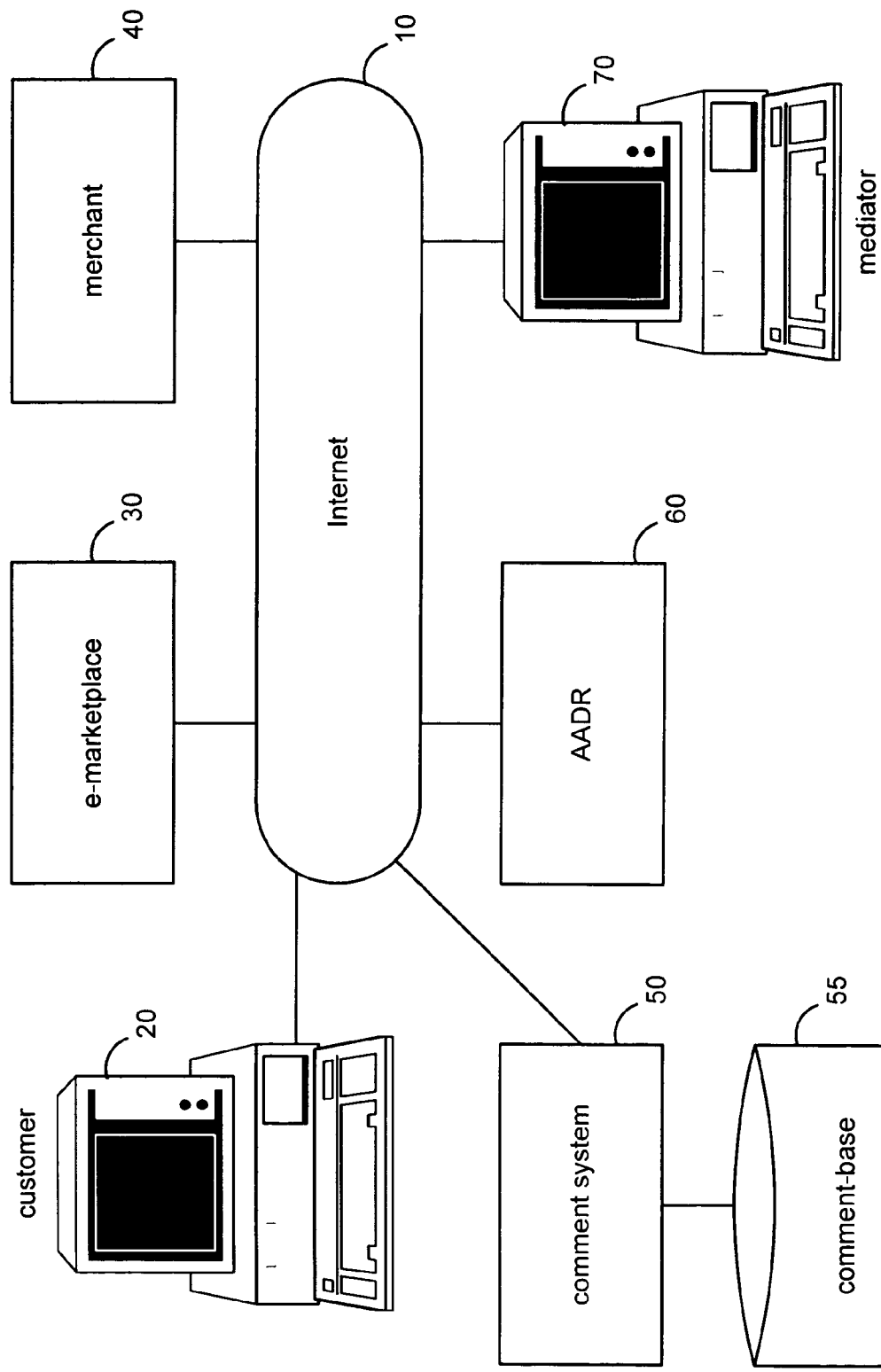
FIG. 1 is a block diagram of the environment of the present invention.

Referring now to the drawings, and in particular to FIG. 1, there is illustrated a block diagram of the environment of the present invention. FIG. 1 shows communication network 10, typically the Internet, coupled to each of customer 20, e-marketplace 30, merchant 40, comment system 50, automated alternative dispute resolution (AADR) system 60 and mediator 70.

Customer 20 and mediator 70 each employ a general-purpose personal computer having web browser software such as Netscape Navigator or Internet Explorer, and each has e-mail capability provided by a dedicated e-mail software package executed by their personal computer or by an e-mail web site.

E-marketplace 30 is a general purpose computer programmed to provide a web site wherein buyers and sellers are brought together, such as an auction web site, or an e-catalog for particular goods.

Merchant 40 is a general-purpose computer programmed to send and receive electronic mail (e-mail). Merchant 40 typically connects to Internet 10 through a third party Internet services provider. In some cases, merchant 40 is a web site directly accessible to customer 20, and also configured for e-mail exchange.

Comment system 50 is connected to comment-base storage 55, which is a magnetic, optical or other storage device for digital information. Customers and merchants each have a profile associated therewith. A profile includes a user-supplied portion providing descriptive and demographic information, a comment portion comprising comment records left by other profile holders about the subject, and an activity portion comprising activity records automatically generated by activity of the user. Each comment record has a series of parameters fields, including creation date, author identification, and content descriptors, such as ratings on a scale of 1 to 5, or chosen from keywords such as poor, fair, good, very good and excellent. Each comment record also has a free-form textual portion. The parameters fields are easily searchable whereas the text field offers an opportunity for more qualitative information.

The comment portion of a profile may have sections, with satisfaction of a pre-requisite required to enable a party to leave a comment. For example, to leave a comment about a merchant, the merchant may require that a customer have visited its web site or purchased from the merchant within a predetermined period before leaving the comment. As another example, to leave a comment, the author may need to be a member of a particular group such as an opera lovers society. Comments left by a party meeting a pre-requisite tend to be more informative than comments left by general parties.

AADR system 60 is a general-purpose computer programmed according to the present invention. In one embodiment, AADR system 60 provides a web site describing the AADR process available through AADR system 60, and providing forms for customers and merchants.

The AADR process will now be described with regard to a transaction in which customer 20 purchased an item from merchant 40 at a web site provided by merchant 40.

FIG. 2 is a chart depicting, at a summary level, the steps in the electronically assisted negotiation process. These steps are performed by software executed by AADR system 60.

At step 100, customer 20 sends a complaint to AADR system 60 which functions to process the complaint and forward the processed complaint to merchant 40. As described below, processing a complaint includes storing the complaint as part of the dispute case record, automatically summarizing the complaint to filter emotional venting, providing relevant legal, procedural and prior case information to customer 20, suggesting an appropriate response to merchant 40, docketing the complaint for follow-up at scheduled intervals, and sending comments to comment system 50 for inclusion in comment-base storage 55.

At step 110, the merchant sends an answer to AADR system 60, which functions to process the answer and forward the processed answer to customer 20. As described below, processing an answer includes storing the answer as part of the dispute case record, automatically summarizing the answer, automatically detecting whether settlement has been reached and advising the customer of his or her procedural alternatives.

Assuming settlement has not been reached, at step 120, customer 20 replies to merchant 40, with AADR system 60 processing the reply to ameliorate emotional ranting, detect agreement for settlement, and update schedules and comments. At step 130, merchant 40 has a final opportunity to respond to customer 20 via a sur-reply that is automatically processed by AADR system 60.

After the complaint is presented, there are a variety of avenues for moving the dispute into mediation 140, discussed below. AADR system 60 automatically summarizes the dispute record and organizes its communication record to assist mediator 70, and retains the dispute on its docket.

When customer 20 and merchant 40 agree on a dispute resolution, the case moves to settlement step 150, during which AADR system 60 checks to ensure that the parties comply with their settlement, updates its docket and leaves appropriate comments for the disputants.

Each of the complaint, answer, reply and sur-reply is a communication that is a portion of a pre-defined dispute resolution process.

Figure 3A:
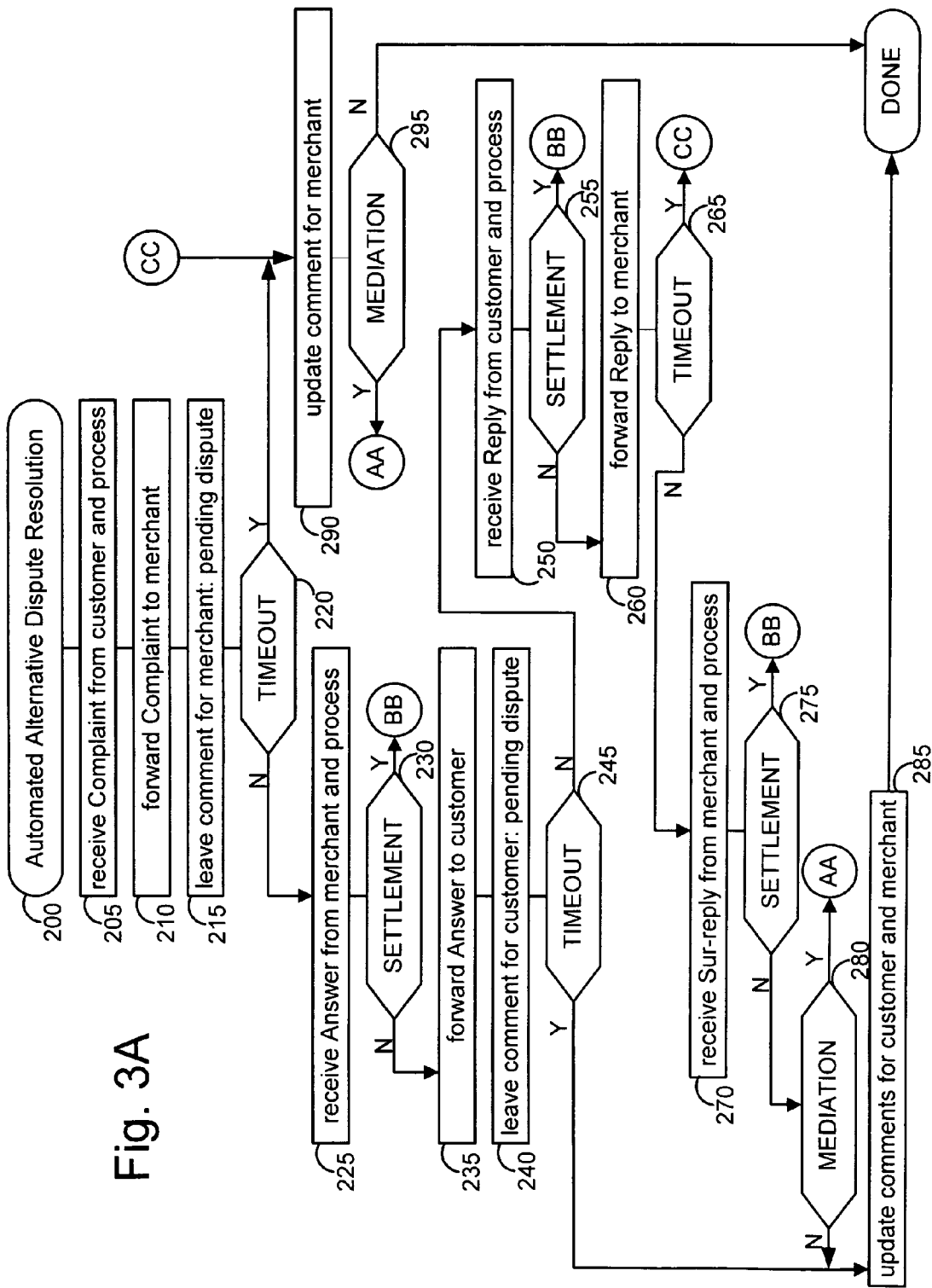
FIGS. 3A-3C are flowcharts depicting details of the overall steps shown in FIG. 2.
Figure 3C:
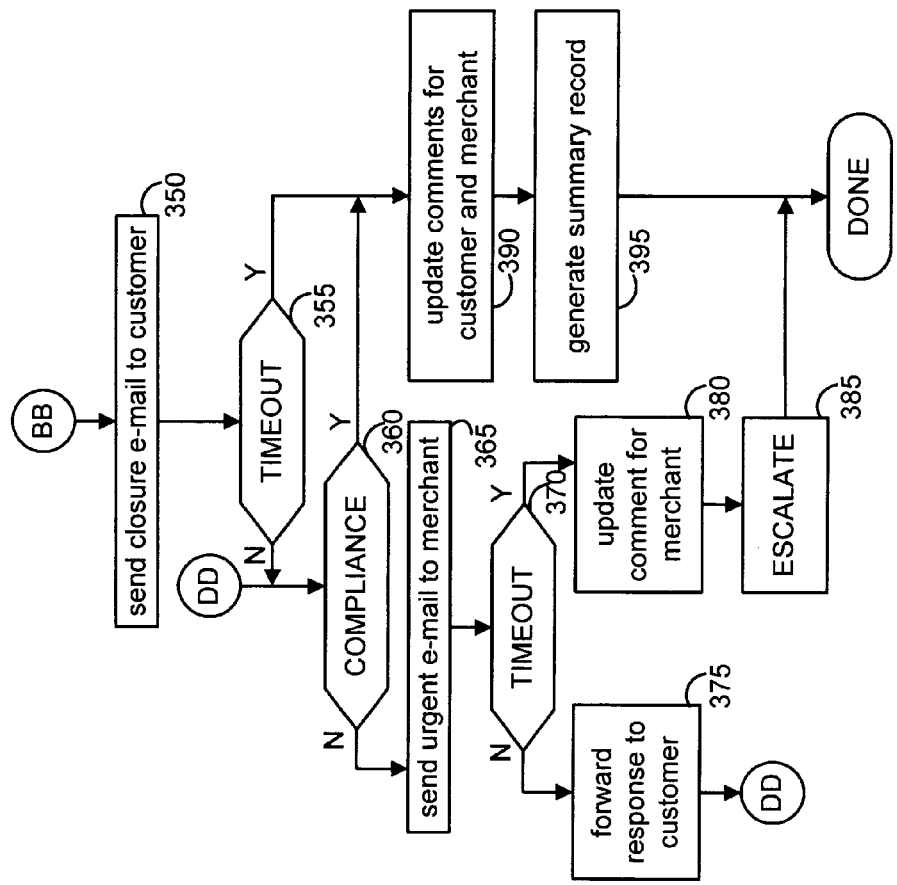
Figure 3B:
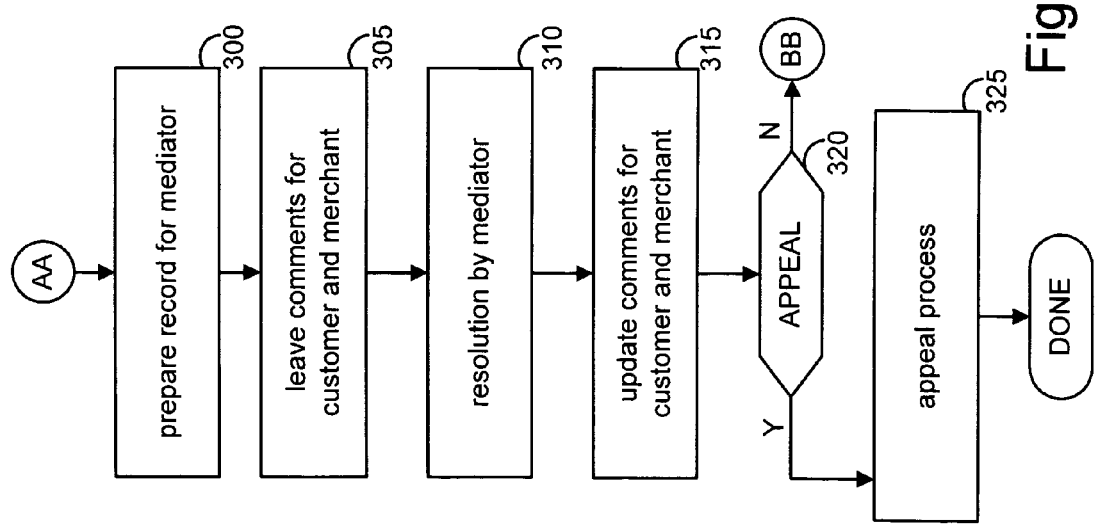

Turning now to FIGS. 3A-3C, collectively referred to as FIG. 3, the AADR process will be described in detail. The correspondence between FIGS. 2 and 3 is broadly as follows:

| FIG. 2 | FIG. 3 |
| --- | --- |
| step 100 | steps 205-220 and 290-295 |
| step 110 | steps 225-245 |
| step 120 | steps 250-265 |
| step 130 | steps 270-285 |
| step 140 | steps 300-325 |
| step 150 | steps 350-395 |

It is assumed that customer 20 has obtained a complaint form from the web site provided by AADR system 60. In other embodiments, customer 20 obtains a complaint form from other sources, such as from the web site provided by e-marketplace 30 or merchant 40. The complaint form solicits information including:

Customer information—actual name, physical address, contact addresses, communication preferences, member name at comment system 50;

Merchant information—name of merchant, web domain address, other contact information as known;

Transaction information—date of sale, receipt of goods, performance of services, customer number, invoice number, people involved (if any);

Specific problem—select from a menu including (i) goods not shipped, (ii) goods arrived damaged, (iii) not as described, (iv) not as expected, (v) changed mind, (vi) overcharged, (vii) poor service, (viii) refund promised but not received, (ix) other Description of problem—provide a free-form text statement, describing collateral harm (if any);

Actions by customer (if any)—provide a free-form text statement;

Specific remedy sought—identify any acceptable solutions, ranking by preference: (i) refund, (ii) replace, (iii) credit at merchant, (iv) partial rebate, (v) other;

Statements relating to remedy (if any)—provide a free form text statement;

Appended materials—if any files or images are appended to complaint, describe the file type and what it shows; and Additional information sources and contact addresses.

When a merchant is complaining about a customer, a generally similar form is used, but the menu of problems instead includes: (i) customer ordered but did not pay, (ii) customer damaged item and returned, (iii) customer returned without permission, and so on.

At step 205, AADR system 60 receives a complaint from customer 20 via electronic mail or via its web site. AADR system 60 notifies customer 20 generally how the dispute resolution process works and where more information can be obtained, provides an estimate of a reasonable time frame and the automatic notification that customer 20 can expect. In one embodiment, AADR system 60 notifies consumer 20 that the cost of dispute resolution is borne by the merchant community, and advising consumer 20 of constructive ways to use the dispute resolution system. In another embodiment, AADR system 60 provides a fee schedule to customer 20, and requires payment before proceeding, and upon certain conditions as appropriate.

Also at step 205, AADR system 60 processes the complaint, to ensure that sufficient information is provided so that the complaint states a problem and at least one desired remedy. In some embodiments, customer 20 need not state a remedy. AADR system 60 also prepares a complaint summary, in first person active language and without emotionally charged adjectives, based on the complaint form, and sends the summary to customer 20 for approval. Approving the summary ensures that customer 20 immediately gets recognition of their concerns, and directs his or her attention to problem resolution, as that is the thrust of the complaint summary.

Natural language processing for a subject specific area is well-known. For example, there are systems for automatically responding to electronic mail, for monitoring chat room conversations and so on. Expert system technology may be employed as appropriate, as the vocabulary and syntax for e-commerce transactions is generally restricted.

In some embodiments, AADR system 60 also checks the facts of the dispute against previously filed but abandoned disputes, to detect customers who are "trying again" to use AADR system 60. Depending on the reason for abandonment of the previously filed dispute, AADR system 60 may escalate the priority of its e-mail messages, note the participant's prior behavior and/or provide an exception report to an administrator of AADR system 60.

In some embodiments, AADR system 60 also provides a few relevant cases to customer 20, based on the information in the complaint form, to make customer 20 feel more comfortable with the automated dispute resolution process, and may also provide pertinent points of law and/or portions of the policy of merchant 40 that were previously provided to AADR system 60.

In some embodiments, AADR system 60 also suggests an appropriate dispute resolution as an addition to or instead of the remedies indicated by customer 20 on the complaint form. A benefit of suggesting outcomes is to focus customer 20 on finishing the dispute, rather than on the history leading to the dispute.

Also during step 205, AADR system 60 configures its data base system to include a new dispute case, specifically, AADR system 60 stores the information provided by customer 20 in the initial complaint, stores its own complaint summary, and enters the case into its docketing system for generating reminders and status e-mail.

At step 210, after customer 20 has approved the complaint summary, AADR system 60 forwards the complaint summary to merchant 40. In some embodiments, customer 20 may indicate approval by failure to object within a predetermined time period. In other embodiments, customer 20 must perform a specified action to indicate approval, such as returning an e-mail to AADR system 60.

During a set-up procedure, merchant 40 registers at AADR system 60, including paying fees or setting up a payment account, and providing contact information, such as a special e-mail address to which AADR system 60 sends dispute related e-mail. Merchant 40 also indicates whether it supports and/or pays for voluntary mediation, and may provide information about its policies to be sent to customers in the event of disputes and/or when a particular type of dispute occurs. In some cases, merchant 40 provides a statement reassuring the customer that he or she is important to merchant 40, and merchant 40 appreciates the customer's time and effort in amicably resolving their dispute. It is assumed that merchant 40 is already registered with comment system 50.

If merchant 40 is not registered with AADR system 60 and/or comment system 50, then AADR system 60 notifies the merchant of the procedures for registering and resolving disputes, and that a customer has filed a complaint relating to merchant 40.

At step 215, AADR system 60 prepares a comment for comment system 50, indicating that there is a dispute pending for merchant 40, and sends the comment to comment system 50. A purpose of providing a comment is to motivate merchant 40 to respond promptly, so as to avoid having its profile filled with aged pending disputes. In some embodiments, comment system 50 allows merchant 40 to specify how much detail about pending disputes is provided in the comments accessible to the public. Another purpose of providing comments is to alert customers to the existence and usage of AADR system 60, to make the customers feel safer about using e-commerce and so that the customers know to use AADR system 60 if they ever have a dispute.

At step 220, AADR system 60 checks whether a response has been received from merchant 40 before the response date docketed at step 205. If merchant 40 has not yet responded, AADR system 60 sends a reminder e-mail with an "urgent" priority, and dockets a "second reminder date". If merchant 40 has still not responded by the second reminder date, then processing proceeds to step 290. In other embodiments, modifications of the automated reminder technique are employed, and/or communication alternatives such as an automatically generated voice mail message or automatically generated fax delivered to merchant 40. The non-responsiveness and/or tardiness of merchant 40 in responding becomes part of the record for this dispute, and is stored by AADR system 60.

At step 290, AADR system 60 prepares a comment for comment system 50 reflecting the non-responsiveness of merchant 40 to the dispute related notification from AADR system 60, and sends the comment to comment system 50. At step 295, AADR system 60 checks whether merchant 40 has agreed to participate in voluntary mediation. If not, AADR system 60 notifies customer 20 of the non-responsiveness of merchant 40 and the availability of other conventional dispute resolution mechanisms, and processing is completed. If merchant 40 has agreed in advance to mediation, then processing proceeds to step 300.

If, at step 220, AADR system 60 receives a response from merchant 40 before its docketed reminder date, then AADR system 60 updates its docket to remove the reminder, and proceeds to step 225.

At step 225, AADR system 60 determines whether the response from merchant 40 is a properly formed answer, such as by checking for the existence of various fields in the answer, and ensuring that the information is within a predetermined absolute range, or range relative to other information in the dispute record. If not, then AADR system 60 automatically contacts merchant 40 identifying the missing or not understood information, and receives clarification; these actions are not shown in FIG. 3 for brevity.

At step 230, AADR system 60 determines whether settlement has been reached, such as by checking whether the answer agrees to at least one of the acceptable remedies identified by customer 20. If so, then processing proceeds to step 350.

If, at step 230, AADR system 60 determines that settlement has not been reached, then at step 235, AADR system 60 forwards the answer from merchant 40 to customer 20, along with a reply form. In some embodiments, AADR system 60 provides additional information such as particular procedural alternatives available and the consequences of each, and suggested action for customer 20.

Also during step 235, AADR system 60 updates its docketing system to reflect the progress of the dispute, for generating reminders and status e-mail.

At step 240, AADR system 60 prepares a comment for comment system 50, indicating that there is a dispute pending for customer 20, and sends the comment to comment system 50. A purpose of providing a comment is to motivate customer 20 to respond promptly, so as to avoid having its profile filled with aged pending disputes. In some embodiments, comment system 50 allows customer 20 to specify how much detail about pending disputes is provided in the comments accessible to the public.

At step 245, AADR system 60 checks whether a response has been received from customer 20 before the response date docketed at step 235. If customer 20 has not yet responded, AADR system 60 sends a reminder e-mail with an "urgent" priority, and dockets a "second reminder date". If customer 20 has still not responded by the second reminder date, then AADR system 60 assumes that customer 20 has abandoned or otherwise resolved his or her dispute, and processing proceeds to step 285. In other embodiments, modifications of the automated reminder technique are employed, and/or communication alternatives such as an automatically generated voice mail message or automatically generated fax delivered to customer 20. The non-responsiveness and/or tardiness of customer 20 in responding becomes part of the record for this dispute, and is stored by AADR system 60.

At step 285, AADR system 60 prepares comments about customer 20, reflecting his or her failure to respond and constructive abandonment of the dispute, and about merchant 40, reflecting its successful resolution of the dispute, and sends the comments to comment system 50. AADR system 60 also prepares a summary of the dispute and adds it to its data base of case records, completing processing of this dispute.

If, at step 245, AADR system 60 receives a response from customer 20 before its docketed reminder date, then AADR system 60 updates its docket to remove the reminder, and proceeds to step 250.

At step 250, AADR system 60 determines whether the response from customer 20 is a properly formed reply, such as by checking for the existence of various fields in the answer, and ensuring that the information is within a predetermined absolute range, or range relative to other information in the dispute record, and by checking whether any additional information requested by merchant 40 has been provided. If not, then AADR system 60 automatically contacts customer 20 identifying the missing or not understood information, and receives clarification; these actions are not shown in FIG. 3 for brevity.

At step 255, AADR system 60 determines whether settlement has been reached, such as by checking whether the reply agrees to at least one of the resolutions proposed by or indicated as acceptable to merchant 40. If so, then processing proceeds to step 350.

If, at step 255, AADR system 60 determines that settlement has not been reached, then at step 260, AADR system 60 forwards the reply from customer 20 to merchant 40. In some embodiments, AADR system 60 provides additional information such as outcomes of related cases, and suggested action for merchant 40.

Also during step 260, AADR system 60 updates its docketing system to reflect the progress of the dispute, for generating reminders and status e-mail.

At step 265, AADR system 60 checks whether a response has been received from merchant 40 before the response date docketed at step 260. If merchant 40 has not yet responded, AADR system 60 sends a reminder e-mail with an "urgent" priority, and dockets a "second reminder date". If merchant 40 has still not responded by the second reminder date, then processing proceeds to step 290.

If, at step 265, AADR system 60 receives a response from merchant 40 before its docketed reminder date, then AADR system 60 updates its docket to remove the reminder, and proceeds to step 270.

At step 270, AADR system 60 determines whether the response from merchant 40 is a properly formed sur-reply, such as by checking for the existence of various fields in the answer, and ensuring that the information is within a predetermined absolute range, or range relative to other information in the dispute record. If not, then AADR system 60 automatically contacts merchant 40 identifying the missing or not understood information, and receives clarification; these actions are not shown in FIG. 3 for brevity.

At step 275, AADR system 60 determines whether settlement has been reached, such as by checking whether the sur-reply agrees to at least one of the acceptable remedies identified by customer 20. If so, then processing proceeds to step 350.

If, at step 275, AADR system 60 determines that settlement has not been reached, then at step 280, AADR system 60 checks whether merchant 40 has agreed to participate in voluntary mediation. If merchant 40 has agreed in advance to mediation, then processing proceeds to step 300. If merchant 40 has not agreed to mediation, then AADR system 60 notifies customer 20 of the failure to reach a dispute resolution and of the availability of other conventional dispute resolution mechanisms. At step 285, AADR system 60 prepares comments about customer 20 and about merchant 40 reflecting their participation in the automated alternative dispute resolution mechanism without a settlement outcome, and sends the comments to comment system 50. AADR system 60 also prepares a summary of the dispute and adds it to its database of case records, completing processing of this dispute.

At step 300, AADR system 60 has determined that merchant 40 will participate in mediation and on what payment terms. If it has not already done so, AADR system 60 notifies customer 20 of the availability of automatically assisted mediation, the procedural aspects, the consequences, the timeframe, the fees, if any, and so on. If customer 20 does not wish to participate in mediation, then AADR system 60 assumes the dispute has been successfully resolved and proceeds to step 390; this is not explicitly shown in FIG. 3 for brevity.

At step 300, AADR system 60 finds a mediator for the automatically assisted mediation. In one embodiment, AADR system 60 selects a mediator from a list of available mediators in accordance with an algorithm reflecting the relevance of the mediator's qualifications to this dispute based on parameters and keywords in the case summary, the preferences, if any, for mediator characteristics expressed by customer 20 and/or merchant 40, and subject to restrictions such as no interests of the mediator in the dispute or disputants. In another embodiment, AADR system 60 prepares a list of potentially suitable mediators and provides this list to customer 20 and merchant 40 so that they may rank their preferences, and AADR system 60 selects the mediator in accordance with the preferences of customer 20 and merchant 40. Let it be assumed that mediator 70 is selected.

At step 300, AADR system 60 prepares a dispute case record for mediator 70, including a summary of what has occurred so far, and a record of all communications between AADR system 60, customer 20 and merchant 40, including any images or attachments submitted by the disputants. AADR system 60 also obtains the comment profiles for customer 20 and merchant 40 from comment system 50 and includes them in the dispute case record. In some embodiments, AADR system 60 also finds relevant completed disputes and appends them to the case record, appends pertinent laws or procedures to the case record, and appends suggested actions to the case record. AADR system 60 also updates its docket to schedule appropriate reminders and status e-mails for this case, as a convenience to mediator 70 and to ensure that the interests of customer 20 are actively pursued.

At step 305, AADR system 60 prepares comments about customer 20 and about merchant 40 reflecting their participation in the mediation portion of the automated alternative dispute resolution mechanism, and sends the comments to comment system 50.

At step 310, mediator 70 conducts an on-line mediation between customer 20 and merchant 40, using AADR system 60 as a docketing, communications, and recording mechanism. Mediator 70 may conduct off-line negotiations, such as telephone calls or face-to-face meetings, and is responsible for preparing a summary of such actions to be part of the case record, and submitting any such summary to AADR system 60. When mediator 70 concludes the mediation, at step 315, AADR system 60 prepares comments about customer 20 and about merchant 40 reflecting their participation in the mediation portion of the automated alternative dispute resolution mechanism, and sends the comments to comment system 50.

Typically, mediator 70 obtains a settlement between customer 20 and merchant 40. At step 320, AADR system 60 determines that neither party will appeal, such as by sending appeal inquiry e-mails, and so processing proceeds to step 350.

However, if at step 320, one of the parties appeals or becomes dissatisfied with the settlement, the processing proceeds to step 325 for subsequent resolution of this dispute. Generally, only narrow grounds are appropriate for an appeal, such as lack of clarity in the settlement, a mistake of fact or a miscalculation, or that the settlement has become impossible to perform.

Although steps 300-325 have been described with respect to mediation, it will be appreciated that, in some embodiments, arbitration is performed instead of mediation.

In a modification, instead of an appeal at step 320, the parties may move from a mediation process to an arbitration process.

At step 350, AADR system 60 has determined that customer 20 and merchant 40 have agreed to a settlement, and sends closure e-mails reflecting this agreement to each of them. AADR system 60 also dockets a reminder e-mail for a predetermined time in the future, such as two weeks. At the predetermined time, AADR system 60 sends reminder e-mails to each of customer 20 and merchant 40, to ensure that they have complied with the terms of the settlement. In particular, customer 20 and merchant 40 must each affirmatively acknowledge that they have complied. In another embodiment, lack of reply may serve as compliance acknowledgment.

At step 355, AADR system 60 checks whether a compliance response has been received from each of customer 20 and merchant 40. If not, AADR system 60 sends a reminder e-mail with an "urgent" priority, and dockets a "second reminder date". If responses have not yet been received at AADR system 60 by the second reminder date, then AADR system 60 assumes satisfactory compliance has occurred and processing proceeds to step 390.

If, at step 355, AADR system 60 receives responses from customer 20 and merchant 40 before its docketed reminder date, then AADR system 60 updates its docket to remove the reminder, and proceeds to step 360.

At step 360, AADR system 60 determines whether compliance with the settlement agreement has occurred. If compliance has occurred, processing proceeds to step 390.

At step 390, AADR system 60 prepares comments about customer 20 and about merchant 40 reflecting their participation in the automated alternative dispute resolution mechanism with a successful settlement, and sends the comments to comment system 50. At step 395, AADR system 60 also prepares a summary of the dispute and adds it to its database of case records, completing processing of this dispute.

If, at step 360, AADR system 60 determines that compliance has not yet occurred, such as by analyzing the type and/or content of response to its previous e-mail, then at step 365, AADR system 60 sends an urgent e-mail to the non-compliant party, assumed to be merchant 40 for exemplary purposes in FIG. 3, and dockets a reminder date.

At step 370, AADR system 60 checks whether a response has been received from merchant 40 by the reminder date. If not, AADR system 60 sends a reminder e-mail with an "urgent" priority, and dockets a "second reminder date". If a response has not yet been received at AADR system 60 by the second reminder date, then AADR system 60 assumes that merchant 40 is non-compliant with an agreed settlement, and, at step 385, executes an escalation procedure, such as referral to a human or to a government agency or other party. AADR system 60 prepares comments as appropriate and updates the case record.

If a response from merchant 40 is received before the reminder date, then at step 375, AADR system 60 logs the response and forwards it to customer 20. For example, merchant 40 may have shipped a replacement, but the replacement may not have arrived. Customer 20 typically sends an e-mail response to merchant 40, not explicitly shown in FIG. 3. AADR system 60 dockets a compliance reminder e-mail date, and processing proceeds to step 355 or 360.

In some embodiments, AADR system 60 sends its case summary to the participants for their approval and so that they may provide general comments on the automated alternative dispute resolution procedure. In some cases, receipt of a case summary from AADR system 60 serves as a pre-requisite event that enables the receiving party, such as customer 20, merchant 40 and/or mediator 70, to leave a comment about AADR system 60 at comment system 50.

In other examples, the customer purchase occurs at e-marketplace 30, and AADR system 60 also functions to assist in determining whether e-marketplace 30 or merchant 40 is the proper party to resolve the customer's dispute. This is beneficial in avoiding a situation in which a customer feels lost such as when each of e-marketplace 30 and merchant 40 disclaim responsibility for dispute resolution. For example, AADR system 60 forwards e-mail on behalf of customer 20 to e-marketplace 30 for purchase of an electronic item. E-marketplace 30 helpfully answers that merchant 40, the manufacturer of the electronic item, is the party to contact. AADR system 60 automatically forwards the customer's problem to merchant 40, while notifying the customer. Merchant 40 answers that due to the nature of the problem, e-marketplace 30 bears responsibility for resolving the customer's problem. AADR system 60 detects that the customer is in a "catch 22" situation, and reacts appropriately, such as by sending a special notice to e-marketplace 30 and merchant 40 requesting one of them participate in conflict resolution, or by selecting the party with the better record of service, or by selecting the geographically closest party, or by randomly selecting one party to participate. AADR system 60 advises the customer of which party is participating in the conflict resolution.

Although the present invention has been described with the customer and mediator each using a personal computer, in other embodiments, an interactive voice response system is coupled to AADR system 60 and allows the consumer and/or mediator to participate by telephone. In some cases, speech-to-text conversion and/or text-to-speech conversion are automatically provided. Instead of a personal computer, another device having a processor, such as a personal assistant or smart phone, may be employed by the customer and/or mediator.

Although not explicitly shown, AADR system 60 may be configured to send copies of communications to additional parties. For example, a mediator-in-training may be provided with the same information as mediator 70, and have the opportunity to conduct a mediation under the supervision of mediator 70. The mediator-in-training can be at a geographically different location than mediator 70, in a different time zone, speaking a different language while using an automatic translation facility that is part of or separate from AADR system 60 and so on.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of processing a complaint, comprising:
   automatically forwarding, from a computer, a complaint approved by the complainer to a first complainee,
   automatically detecting, at the computer, that the first complainee caused the complaint to be forwarded to a second complainee,
   automatically detecting, at the computer, that the second complainee indicated that the complaint should be forwarded to the first complainee, and
   automatically initiating, at the computer, a procedure to determine which of the first complainee and second complainee is responsible for substantively responding to the complaint.

2. The method of claim 1, wherein the procedure includes sending a notice to the first and second complainees requesting that they determine which of them is responsible for substantively responding to the complaint.

3. The method of claim 1, wherein the procedure includes automatically selecting one of the first and second complainees to substantively respond to the complaint.

4. A method of processing a complaint, comprising:
   automatically receiving, at a computer, information from a complainer including information relating to a problem experienced by the complainer and information identifying the complainer,
   automatically suggesting, at the computer, at least one remedy to the complainer,
   automatically receiving, at the computer, a response to the at least one suggested remedy,
   automatically preparing, at the computer, the complaint based on the information and the response received from the complainer,
   automatically presenting, from the computer, the prepared complaint to the complainer for approval to generate an approved complaint, and
   automatically forwarding, from the computer, the approved complaint to the complainee.

5. The method of claim 4, wherein the prepared complaint includes emotional state information relating to the complainer.

6. The method of claim 4, further comprising docketing the approved complaint for predetermined actions at predetermined times.

7. The method of claim 4, further comprising providing a response from the complainee to the complainer.

8. The method of claim 4, further comprising providing data relating to other complaints to the complainer prior to preparing the complaint.

\* \* \* \* \*